(12) United States Patent
Hall et al.

(10) Patent No.: US 8,025,227 B2
(45) Date of Patent: Sep. 27, 2011

(54) ACCESS TO DISTRIBUTED DATABASES VIA POINTER STORED IN RFID TAG

(75) Inventors: Kenwood H. Hall, Hudson, OH (US); Vivek R. Bapat, Pittsburgh, PA (US); Sujeet Chand, Brookfield, WI (US); Richard A. Morse, Hudson, OH (US); Joseph P. Owen, Jr., Elm Grove, WI (US); Arthur P. Pietrzyk, Thompson, OH (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1336 days.

(21) Appl. No.: 11/241,421

(22) Filed: Sep. 30, 2005

(65) Prior Publication Data

US 2007/0075128 A1   Apr. 5, 2007

(51) Int. Cl.
*G06F 19/00* (2011.01)
(52) U.S. Cl. .......................................... 235/385
(58) Field of Classification Search ............. 235/385
See application file for complete search history.

(56) References Cited

U.S. PATENT DOCUMENTS

| | | | |
|---|---|---|---|
| 2,999,499 A | 9/1961 | Willet | |
| 3,858,212 A | 12/1974 | Tompkins et al. | |
| 4,381,903 A | 5/1983 | Atkins | |
| 4,722,372 A | 2/1988 | Hoffman et al. | |
| 4,949,299 A | 8/1990 | Pickett et al. | |
| 4,967,940 A | 11/1990 | Blette et al. | |
| 5,300,875 A | 4/1994 | Tuttle | |
| 5,461,666 A | 10/1995 | McMahan et al. | |
| 5,494,193 A | 2/1996 | Kirschner et al. | |
| 5,613,228 A | 3/1997 | Tuttle et al. | |
| 5,621,199 A | * 4/1997 | Calari et al. | |
| 5,629,981 A | 5/1997 | Nerlikar | |
| 5,689,415 A | 11/1997 | Calotychos et al. | |
| 5,701,127 A | 12/1997 | Sharpe | |
| 5,703,347 A | 12/1997 | Reddersen et al. | |
| 5,785,181 A | 7/1998 | Quartararo, Jr. | |

(Continued)

FOREIGN PATENT DOCUMENTS

CN           1426546 A      6/2003

(Continued)

OTHER PUBLICATIONS

European Search Report dated Feb. 6, 2006 mailed Feb. 20, 2006 for European Patent Application Serial No. 10/985,173, 3 Pages.

(Continued)

*Primary Examiner* — Jamara A Franklin
(74) *Attorney, Agent, or Firm* — Turocy & Watson LLP; William R. Walbrun; John M. Miller

(57) ABSTRACT

Radio frequency identification (RFID) technology in a data management scheme that combines both distributed as well as a hierarchical (object-oriented) data management structure. The hierarchical databases will store data records such that each or selected entities of the record will be associated with a pointer that can be written into an RFID tag of an item as the item progresses through manufacturing, production, transportation, and consumer user, for example. Thereafter, once the RFID tag is read, the pointer information can be processed to directly access the data in the database associated with the pointer.

25 Claims, 12 Drawing Sheets

U.S. PATENT DOCUMENTS

| | | |
|---|---|---|
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,947,167 A | 9/1999 | Bogen et al. |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |
| 5,983,200 A | 11/1999 | Slotznick |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 * | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 * | 12/2001 | Mabry et al. ................. 235/383 |
| 6,342,839 B1 | 1/2002 | Curkendall et al. |
| 6,353,406 B1 | 3/2002 | Lanzl et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-jones |
| 6,392,544 B1 * | 5/2002 | Collins et al. |
| 6,400,272 B1 | 6/2002 | Holtzman |
| 6,400,372 B1 | 6/2002 | Gossweiler, III et al. |
| 6,401,936 B1 | 6/2002 | Issacs |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Iasacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 * | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,587,856 B1 | 7/2003 | Srinivasan et al. |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 * | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 * | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,685,059 B2 | 2/2004 | Jones et al. |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lizo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi |
| 6,809,646 B1 | 10/2004 | Lee |
| 6,812,824 B1 | 11/2004 | Goldinger et al. |
| 6,812,838 B1 | 11/2004 | Maloney |
| 6,812,841 B2 | 11/2004 | Heinrich et al. |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Braginsky et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 * | 5/2005 | Swan et al. |
| 6,903,656 B1 * | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,945,721 B2 | 9/2005 | Sato |
| 6,967,579 B1 | 11/2005 | Elizondo |
| 6,975,229 B2 | 12/2005 | Carrender et al. |
| 6,992,574 B2 | 1/2006 | Aupperie |
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,687 B2 | 6/2006 | Chapman et al. |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |

| | | | | | | |
|---|---|---|---|---|---|---|
| 7,084,769 B2 | 8/2006 | Bauer et al. | | 2005/0028417 A1 | 2/2005 | Kim |
| 7,091,861 B2 * | 8/2006 | Schmidtberg et al. ..... 340/572.1 | | 2005/0035849 A1 * | 2/2005 | Yizhack |
| 7,114,655 B2 | 10/2006 | Chapman et al. | | 2005/0040934 A1 * | 2/2005 | Shanton |
| 7,127,507 B1 | 10/2006 | Clark et al. | | 2005/0052283 A1 * | 3/2005 | Collins et al. |
| 7,135,976 B2 | 11/2006 | Neff et al. | | 2005/0058483 A1 | 3/2005 | Chapman et al. |
| 7,151,456 B2 | 12/2006 | Godfrey | | 2005/0062603 A1 | 3/2005 | Fuerst et al. |
| 7,165,722 B2 | 1/2007 | Shafer et al. | | 2005/0068179 A1 | 3/2005 | Roesner |
| 7,183,922 B2 | 2/2007 | Mendolia et al. | | 2005/0083180 A1 | 4/2005 | Horwitz |
| 7,187,288 B2 | 3/2007 | Mendolia et al. | | 2005/0088299 A1 * | 4/2005 | Bandy et al. |
| 7,194,072 B2 | 3/2007 | Gamble | | 2005/0092825 A1 * | 5/2005 | Cox et al. |
| 7,195,159 B2 | 3/2007 | Sloan et al. | | 2005/0093678 A1 * | 5/2005 | Forster et al. |
| 7,197,279 B2 | 3/2007 | Bellantoni | | 2005/0093703 A1 | 5/2005 | Twitchell |
| 7,212,637 B2 | 5/2007 | Salisbury | | 2005/0099268 A1 | 5/2005 | Juels et al. |
| 7,221,258 B2 * | 5/2007 | Lane et al. ............... 340/10.1 | | 2005/0110641 A1 * | 5/2005 | Mendolia et al. |
| 7,230,730 B2 | 6/2007 | Owen et al. | | 2005/0135181 A1 | 6/2005 | Shionoiri et al. |
| 7,240,027 B2 | 7/2007 | McConnell et al. | | 2005/0140511 A1 * | 6/2005 | Bonnell et al. |
| 7,272,502 B2 | 9/2007 | Lee et al. | | 2005/0143026 A1 | 6/2005 | Bellantoni |
| 7,292,963 B2 | 11/2007 | Bornhoevd et al. | | 2005/0143916 A1 | 6/2005 | Kim et al. |
| 7,317,394 B2 | 1/2008 | Koh et al. | | 2005/0145688 A1 | 7/2005 | Milenkovic et al. |
| 7,336,153 B2 | 2/2008 | Malone et al. | | 2005/0149414 A1 * | 7/2005 | Schrodt et al. |
| 7,336,167 B2 | 2/2008 | Olsen, III et al. | | 2005/0154572 A1 * | 7/2005 | Sweeney |
| 7,336,243 B2 | 2/2008 | Jo et al. | | 2005/0155213 A1 * | 7/2005 | Eastin |
| 7,339,476 B2 | 3/2008 | Macurek et al. | | 2005/0159913 A1 | 7/2005 | Ariyoshi et al. |
| 7,345,576 B2 | 3/2008 | Allen et al. | | 2005/0162256 A1 * | 7/2005 | Kinoshita |
| 7,373,087 B2 | 5/2008 | Shi et al. | | 2005/0170784 A1 | 8/2005 | Ariyoshi et al. |
| 7,388,491 B2 | 6/2008 | Chand et al. | | 2005/0177423 A1 * | 8/2005 | Swanson |
| 7,389,921 B2 | 6/2008 | Lin et al. | | 2005/0177466 A1 | 8/2005 | Willins |
| 7,486,181 B2 | 2/2009 | Olsen et al. | | 2005/0179521 A1 * | 8/2005 | Pillai et al. |
| 7,510,110 B2 | 3/2009 | Pietrzyk et al. | | 2005/0180566 A1 | 8/2005 | Ryal |
| 7,520,429 B2 | 4/2009 | Koster | | 2005/0188095 A1 | 8/2005 | Gardiner et al. |
| 7,551,081 B2 | 6/2009 | Vrba et al. | | 2005/0190098 A1 | 9/2005 | Bridgelall et al. |
| 7,616,117 B2 | 11/2009 | Streeb et al. | | 2005/0192727 A1 | 9/2005 | Shostak et al. |
| 7,720,438 B2 | 5/2010 | Rowse | | 2005/0197775 A1 | 9/2005 | Smith |
| 7,764,191 B2 | 7/2010 | Hall et al. | | 2005/0200457 A1 | 9/2005 | Bridgelall et al. |
| 2001/0000019 A1 * | 3/2001 | Bowers et al. | | 2005/0206552 A1 | 9/2005 | Friedrich |
| 2001/0008390 A1 | 7/2001 | Berquist | | 2005/0206555 A1 * | 9/2005 | Bridgelall et al. |
| 2001/0015760 A1 | 8/2001 | Fellegara et al. | | 2005/0212660 A1 | 9/2005 | Hansen et al. |
| 2002/0005774 A1 | 1/2002 | Rudolph | | 2005/0212673 A1 * | 9/2005 | Forster |
| 2002/0030597 A1 | 3/2002 | Muirhead | | 2005/0212676 A1 | 9/2005 | Steinberg |
| 2002/0067265 A1 | 6/2002 | Rudolph | | 2005/0219039 A1 | 10/2005 | Allen |
| 2002/0070862 A1 | 6/2002 | Francis et al. | | 2005/0228528 A1 | 10/2005 | Farchmin et al. |
| 2002/0130778 A1 * | 9/2002 | Nicholson | | 2005/0237162 A1 | 10/2005 | Hyde et al. |
| 2002/0143320 A1 | 10/2002 | Levin | | 2005/0240305 A1 | 10/2005 | Bogash et al. |
| 2002/0155843 A1 | 10/2002 | Bahl et al. | | 2005/0241548 A1 | 11/2005 | Muirhead |
| 2002/0165758 A1 * | 11/2002 | Hind et al. | | 2005/0253717 A1 | 11/2005 | Howarth et al. |
| 2002/0167397 A1 | 11/2002 | Eroglu et al. | | 2005/0253718 A1 | 11/2005 | Droms et al. |
| 2002/0185532 A1 * | 12/2002 | Berquist et al. | | 2005/0258955 A1 | 11/2005 | Gloekler et al. |
| 2003/0007473 A1 | 1/2003 | Strong et al. | | 2005/0264401 A1 | 12/2005 | Haller et al. |
| 2003/0023337 A1 | 1/2003 | Godfrey et al. | | 2005/0269407 A1 | 12/2005 | Harmon |
| 2003/0071731 A1 | 4/2003 | Jesme | | 2006/0006231 A1 * | 1/2006 | Anson et al. |
| 2003/0102367 A1 | 6/2003 | Monette et al. | | 2006/0027658 A1 | 2/2006 | Genc et al. |
| 2003/0109951 A1 | 6/2003 | Hsiung et al. | | 2006/0038077 A1 | 2/2006 | Olin et al. |
| 2003/0126103 A1 | 7/2003 | Chen et al. | | 2006/0049250 A1 | 3/2006 | Sullivan |
| 2003/0150908 A1 | 8/2003 | Pokorny et al. | | 2006/0053234 A1 | 3/2006 | Kumar et al. |
| 2003/0169149 A1 * | 9/2003 | Ohki et al. | | 2006/0055508 A1 | 3/2006 | Kumar et al. |
| 2003/0203730 A1 | 10/2003 | Wan et al. | | 2006/0060657 A1 | 3/2006 | Choong et al. |
| 2003/0210142 A1 | 11/2003 | Freathy et al. | | 2006/0071774 A1 | 4/2006 | Brown et al. |
| 2003/0216969 A1 | 11/2003 | Bauer et al. | | 2006/0097873 A1 | 5/2006 | Vrba et al. |
| 2003/0225635 A1 | 12/2003 | Renz et al. | | 2006/0108411 A1 | 5/2006 | Macurek et al. |
| 2004/0008123 A1 | 1/2004 | Carrender et al. | | 2006/0125653 A1 | 6/2006 | McQuade |
| 2004/0024570 A1 | 2/2004 | Muehl et al. | | 2006/0125694 A1 | 6/2006 | Dejanovic et al. |
| 2004/0024644 A1 | 2/2004 | Gui et al. | | 2006/0145850 A1 | 7/2006 | Krstulich |
| 2004/0032443 A1 | 2/2004 | Moylan | | 2006/0170565 A1 | 8/2006 | Husak et al. |
| 2004/0046642 A1 | 3/2004 | Becker et al. | | 2006/0200256 A1 | 9/2006 | Mason et al. |
| 2004/0061324 A1 | 4/2004 | Howard | | 2006/0208859 A1 | 9/2006 | Hougen et al. |
| 2004/0062294 A1 | 4/2004 | Clemens et al. | | 2006/0232382 A1 | 10/2006 | Bauer et al. |
| 2004/0066281 A1 * | 4/2004 | Hughes et al. | | 2006/0250248 A1 * | 11/2006 | Tu et al. ..................... 340/572.4 |
| 2004/0069851 A1 | 4/2004 | Grunes | | 2006/0279412 A1 | 12/2006 | Holland et al. |
| 2004/0084526 A1 | 5/2004 | Knowles et al. | | 2007/0008073 A1 | 1/2007 | Poasevara |
| 2004/0095910 A1 | 5/2004 | Metts et al. | | 2007/0013517 A1 | 1/2007 | Posamentier |
| 2004/0108378 A1 | 6/2004 | Gatz | | 2007/0013519 A1 | 1/2007 | Chung et al. |
| 2004/0124988 A1 | 7/2004 | Leonard et al. | | 2007/0018820 A1 | 1/2007 | Chand et al. |
| 2004/0160324 A1 | 8/2004 | Stilp | | 2007/0035396 A1 | 2/2007 | Chand et al. |
| 2004/0181467 A1 | 9/2004 | Raiyani et al. | | 2007/0040681 A1 | 2/2007 | Jessup |
| 2004/0189443 A1 * | 9/2004 | Eastburn | | 2007/0055470 A1 | 3/2007 | Pietrzyk et al. |
| 2004/0220860 A1 * | 11/2004 | Persky et al. | | 2007/0063029 A1 | 3/2007 | Brandt et al. |
| 2004/0252025 A1 | 12/2004 | Silverbrook et al. | | 2007/0075832 A1 | 4/2007 | Morse et al. |
| 2005/0012613 A1 * | 1/2005 | Eckstein et al. | | 2007/0137531 A1 | 6/2007 | Muirhead |
| 2005/0021369 A1 | 1/2005 | Cohen et al. | | 2007/0159311 A1 | 7/2007 | Schober |

| | | | |
|---|---|---|---|
| 2007/0159331 | A1 | 7/2007 | Zegelin |
| 2007/0205860 | A1 | 9/2007 | Jones et al. |
| 2007/0205861 | A1 | 9/2007 | Nair et al. |
| 2008/0118378 | A1 | 5/2008 | Baron et al. |
| 2008/0278328 | A1 | 11/2008 | Chand et al. |
| 2009/0206154 | A1 | 8/2009 | Pietrzyk et al. |
| 2009/0243808 | A1 | 10/2009 | Vrba et al. |
| 2009/0254199 | A1 | 10/2009 | Vrba et al. |

FOREIGN PATENT DOCUMENTS

| | | |
|---|---|---|
| CN | 1801714 A | 7/2006 |
| CN | 1952950 A | 4/2007 |
| CN | 101300609 A | 11/2008 |
| CN | 101356543 A | 1/2009 |
| CN | 100512117 C | 7/2009 |
| DE | 10314260 A1 | 10/2004 |
| EP | 1542105 A | 6/2005 |
| EP | 1 557 806 A2 | 7/2005 |
| EP | 1 657 609 A1 | 11/2005 |
| EP | 1 657 606 A1 | 5/2006 |
| EP | 1 750 185 A2 | 2/2007 |
| EP | 1 752 908 A2 | 2/2007 |
| EP | 1 772 812 A2 | 4/2007 |
| EP | 1 657 609 B1 | 3/2010 |
| WO | 0016289 | 3/2000 |
| WO | 0058752 | 10/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2004/040387 A | 5/2004 |
| WO | 2005045743 A | 5/2005 |
| WO | 2005098737 A2 | 10/2005 |
| WO | 2007 021648 A2 | 2/2007 |
| WO | 2007/030394 A | 3/2007 |
| WO | 2007/030544 A2 | 3/2007 |
| WO | 2007/030544 A3 | 3/2007 |
| WO | 2008063553 A2 | 5/2008 |

OTHER PUBLICATIONS

M. Karkkainen, et al.: "The product centric approach: a solution to supply network information management problems?" Computers in Industry, Elsevier Science Publishers. Amsterdam, NL, vol. 52, No. 2, Oct. 2003.
European Search Report dated Feb. 14, 2006 mailed Feb. 20, 2006 for European Patent Application Serial No. 10/985,621, 3 Pages.
International Search Report for PCT Application No. PCT/US06/34290, mailed Feb. 5, 2008, 2 pages.
Partial International Search Report dated Mar. 30, 2006, for PCT Application Serial No. PCT/EP2005/007878, 3 pages.
International Search Report dated May 17, 2006 for International Patent Application Serial No. PCT/EP2005/007878, 8 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
Oa dated May 14, 2009 for U.S. Appl. No. 11/239,959, 37 pages.
CNOA due Apr. 1, 2008 for Chinese Patent Application No. 200510137387.6, 21 pages.
European Search Report dated Nov. 20, 2009 for European Patent Application No. EP 06 80 3042, 7 pages.
OA dated Jan. 13, 2010 for U.S. Appl. No. 12/263,750, 16 pages.
OA dated Aug. 21, 2009 for U.S. Appl. No. 11/239,959, 34 pages.
OA Dated Jul. 28, 2009 for U.S. Appl. No. 11/220,130, 32 pages.
OA dated Jul. 30, 2009 for U.S. Appl. No. 12/263,750, 65 pages.
OA dated Sep. 21, 2009 for U.S. Appl. No. 11/190,143, 27 pages.
OA dated Oct. 8, 2009 for U.S. Appl. No. 11/200,915, 41 pages.
OA dated Oct. 27, 2009 for U.S. Appl. No. 11/230,758, 39 pages.
OA dated Mar. 1, 2010 for U.S. Appl. No. 11/239,959, 29 pages.
OA dated Jun. 23, 2010 for U.S. Appl. No. 12/040,305, 30 pages.
OA dated Jun. 18, 2010 for U.S. Appl. No. 12/140,118, 13 pages.
OA Dated Jul. 8, 2010 for U.S. Appl. No. 11/200,915, 52 pages.
International Search Report mailed Jun. 5, 2008 for PCT Application No. PCT/US2007/024049, 1 page.
European Search Report dated Jun. 9, 2008 for European Patent Application No. EP 06 02 0479, 2 pages.
International Search Report mailed Mar. 14, 2007 for PCT Application No. PCT/US2006/030751, 2 pages.
Partial European Search Report dated Nov. 3, 2008 for European Patent Application No. EP 06 01 5620, 5 pages.
CN OA dated Aug. 13, 2010 for Chinese Application No. 200680029337.9, 7 pages.
OA dated Oct. 25, 2010 for U.S. Appl. No. 12/040,305, 23 pages.
OA dated Dec. 22, 2010 for U.S. Appl. No. 11/200,915 27 pages.
Notice of Allowance dated Apr. 1, 2011 for U.S. Appl. No. 12/481,965, 81 pages.

* cited by examiner

ACCESS TO DISTRIBUTED DATABASES VIA POINTER STORED IN RFID TAG

TECHNICAL FIELD

This invention is related to databases, and more specifically, the use of distributed databases in an RFID manufacturing environment.

BACKGROUND OF THE INVENTION

As manufacturing, processing, shipping, and other industrial processes incorporate radio frequency identification (RFID) technology into their infrastructure, the need for efficient and effective information management schemes becomes preeminent. An RFID tagged item moving from raw materials to assembly to transport to consumer purchase generates a highly distributed yet still inter-related series of associated data along the way. Logistical difficulties arise when one attempts to access information associated with the RFID component-containing item because this information is distributed among all the various physical locations where the item was assembled, processed, shipped, stocked, etc.

By way of illustration and not limitation, when a fully assembled item leaves a factory to be shipped, information on its RFID component can be recorded as it leaves. That information can be stored at a data store physically located at the factory. When the item arrives at a receiving area, the information on its RFID component can be recorded again, with additional information concerning the item's receipt at the receiving area recorded upon the item's receipt, or optionally written to the RFID component at that time. That information can be stored at a data store physically located at the receiving area. Consequently, the information associated with the RFID tagged item exists in two different physical locations (i.e., at the factory and at the receiving area). To obtain an accurate information history for the RFID component-containing item, one must be able to access the information in both physical locations across a database system.

As RFID is pulled deeper into manufacturing operations and utilized at an item level, manufacturers will be faced with an information explosion that includes inter-related, but highly distributed, information related to the production and distribution of a particular product. In particular, compliance requirements will increase, driving up the requirements for manufacturers to efficiently and seamlessly support tracking and tracing of products at a high level of granularity.

To support these requirements the information that can potentially be captured by RFID can include every aspect of how the product was manufactured—such as the bill of materials, supplier identification, recipe, or even machines/tooling/fixtures at each process step and beyond. Although related to each other, this information may also have to reside in several different databases from the automation level (local) to the enterprise level (global) due to legacy systems already in place and to the geographic distribution of facilities that can exist in an enterprise. In order to manage and harness this information explosion beneficially, sophisticated data management methodologies built upon standardized nomenclature, structure and format are needed to represent manufacturing and process information that can be captured to an item level tag.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to the use of radio frequency identification (RFID) technology in a data management scheme that combines both distributed as well as a hierarchical (object-oriented) data management structure. The hierarchical databases will store data records such that each or selected entities of the record will be associated with a pointer that can be written into an RFID tag of an item as the item progresses through manufacturing, production, transportation, and consumer user, for example. Thereafter, once the RFID tag is read, the pointer information can be processed to directly access the data in the database associated with the pointer.

In another aspect, the record elements can be further associated with both backward and forward pointers. In other words, this facilitates moving down the hierarchy in a forward direction to access more specific data and up the hierarchy in a backward direction to access more general categories of information, and even move to a different database. Accordingly, the pointers can be utilized to reference a chain of standardized hierarchical databases across a supply chain.

In one aspect of the subject invention, a pointer written to an RFID tag can reference a chain of standardized hierarchical databases across the supply chain. This supports traceability of parts and in an assembly that includes many RFID tagged parts. The information referenced from this pointer could then be used by at least one of a programmable logic controller (PLC), a management system, and a logistics network. The information referenced from this pointer can be physically stored at different places within the enterprise. A standardized data structure that points to relevant production information will make it easier and faster for disparate manufacturing facilities to manage RFID information.

In yet another aspect, the standardized data structure pointing to relevant product information makes it easier for software agents and/or automated decision-making entities to manage decision-making. Accordingly, routine decisions may be administered by such agents and/or entities, with provisions for employee notification in a situation that requires employee attention.

In still another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
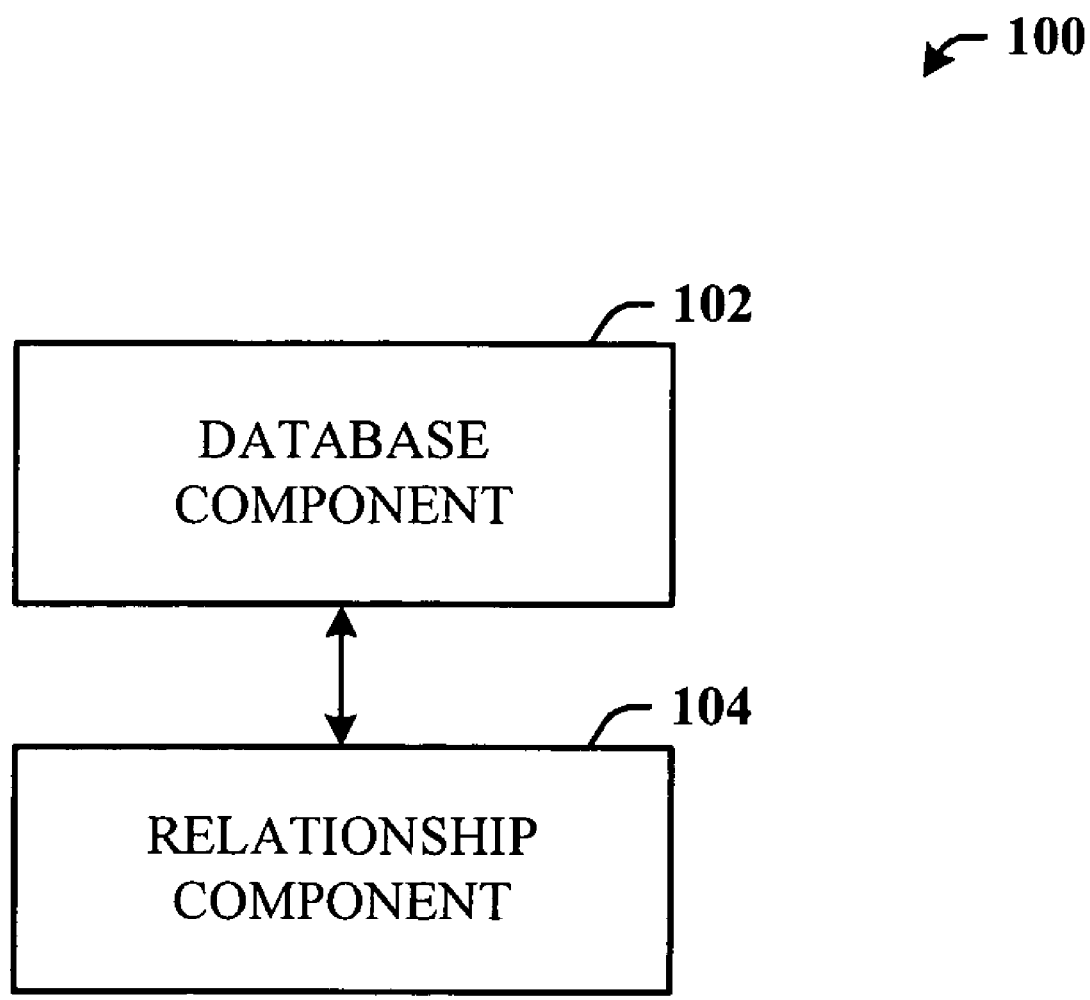
FIG. 1 illustrates a system that facilitates data management in an RFID local and/or enterprise manufacturing environment in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates data management in an RFID local and/or enterprise manufacturing environment (e.g., ERP—enterprise resource planning) in accordance with an aspect of the invention. The system 100 can include a database component 102 which can be a distributed hierarchical (as well as object oriented) database system that is distributed across an enterprise to store some or all aspects of product manufacture, production, transportation and consumer data, for example. The system 100 can also include a relationship component 104 that creates an association between records and/or elements of the database component 102. In one implementation, the relationship is manifested by a pointer between some or all of the record entities.

The hierarchical databases will store data records such that each or selected entities of the record will be associated with a pointer that can be written into an RFID tag of an item as the item progresses through manufacturing, production, transportation, and consumer user, for example. Thereafter, once the RFID tag is read, the pointer information can be processed to directly access the data in the database associated with the pointer.

In another aspect, the record elements of the distributed hierarchical database can be further associated with both backward and forward pointers. In other words, this facilitates moving down the hierarchy in a forward direction to access more specific data and up the hierarchy in a backward direction to access more general categories of information, and even move to a different database. Accordingly, the pointers can be utilized to reference a chain of standardized hierarchical databases across a supply chain.

A pointer written to an RFID tag can reference a chain of standardized databases across a supply chain. Because the RFID tag is object-oriented and the standardized databases are distributed across a variety of physical locations, this approach combines distributed and hierarchical data management structures. The pointer may be virtually any data or information that sufficiently indicates where information associated with the item can be found in a database. For reference purposes, the information concerning the location of the information associated with the item can be referred to as an address. Examples of such an address include an HTTP hyperlink, an alphanumeric designation, and a directory path, for example. By embedding the address on the RFID tag associated with the item, the information kept on the RFID tag can be simplified, leading to a more efficient data management system.

The pointer can be programmed in any convenient format, provided that the format is readable by an RFID scanning system (not shown). The pointer can contain information stored in the standardized hierarchical database, including bill of materials information, supplier identification data, recipe data, and machine/tooling/fixtures/processing information that was utilized at each process step. In so doing, the pointer forms a connection between an object-oriented data management scheme (i.e., the RFID tag associated with the item) and a highly distributed data management scheme (i.e., the disparate physical locations of the standardized hierarchical databases across the supply chain).

Figure 2:
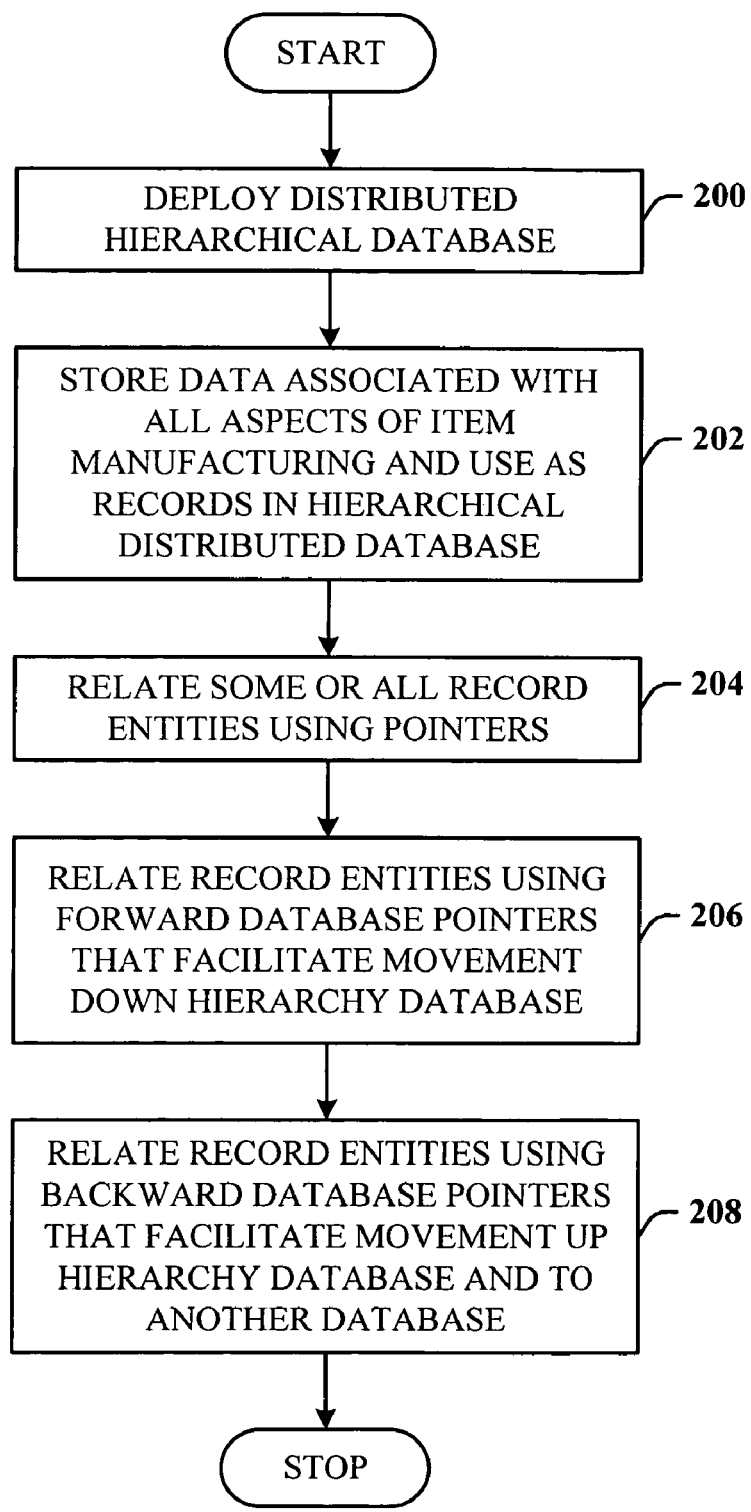
FIG. 2 illustrates a methodology of managing data in an ERP environment.

FIG. 2 illustrates a methodology of managing data in an ERP environment. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a distributed hierarchical database system is deployed in an item manufacturing enterprise such as an ERP system. At 202, the item data associated with all aspects of the item use and manufacturing is stored in the database system as records. At 204, some or all of record entities or elements are related to one another using pointers. These pointers can include backward and forward pointers. At 206, forward pointers are employed to allow movement and selection of information down the hierarchical tree. At 206, a backward pointer allows movement and selection of information up the hierarchical tree of a database. Additionally, the backward pointer can further allow movement up the tree to a level where movement is from one database to another, for example.

Figure 3:
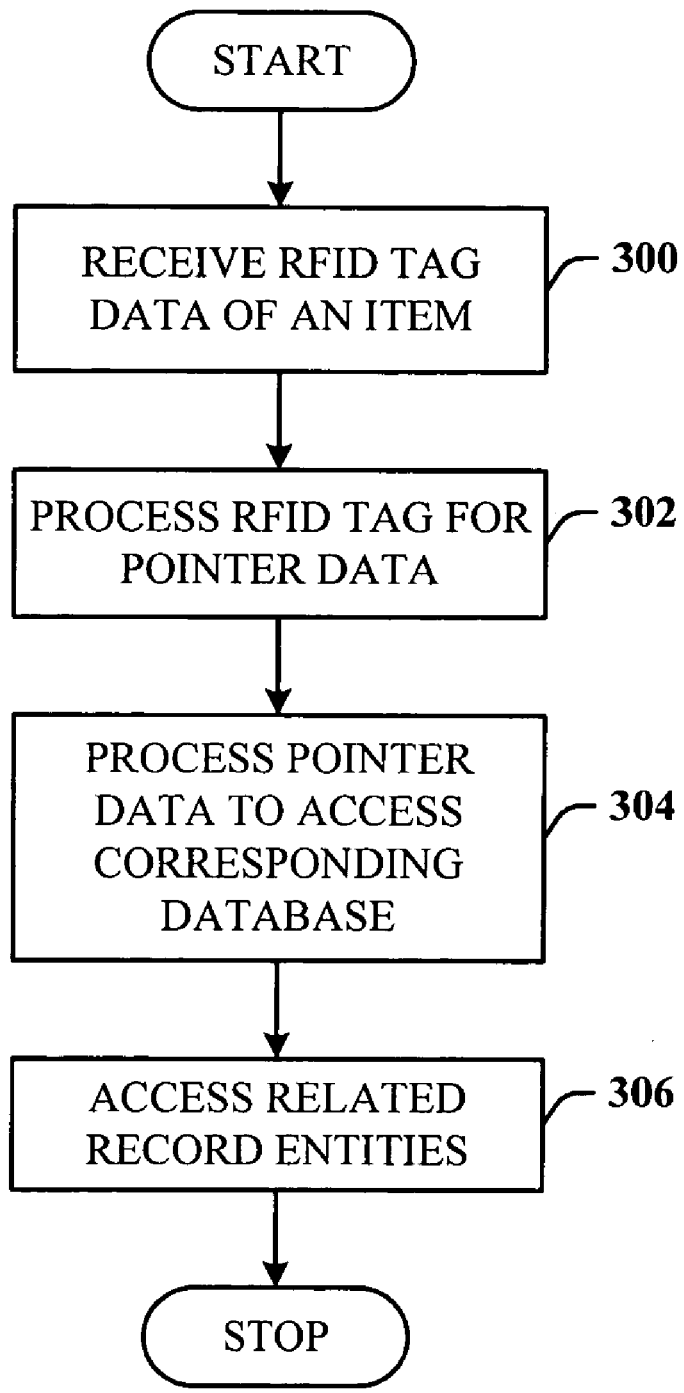
FIG. 3 illustrates a methodology of accessing a pointer in an RFID tag to gain direct access to the associated database data.

FIG. 3 illustrates a methodology of accessing a pointer in an RFID tag to gain direct access to the associated database data. At 300, an RFID tagged item is received. At 302, the tag is read and pointer data stored therein extracted. At 304, the pointer data is processed to access not only the corresponding database, but also the data to which the pointer points. At 306, an entity or element of the data record can further be accessed.

Figure 4:
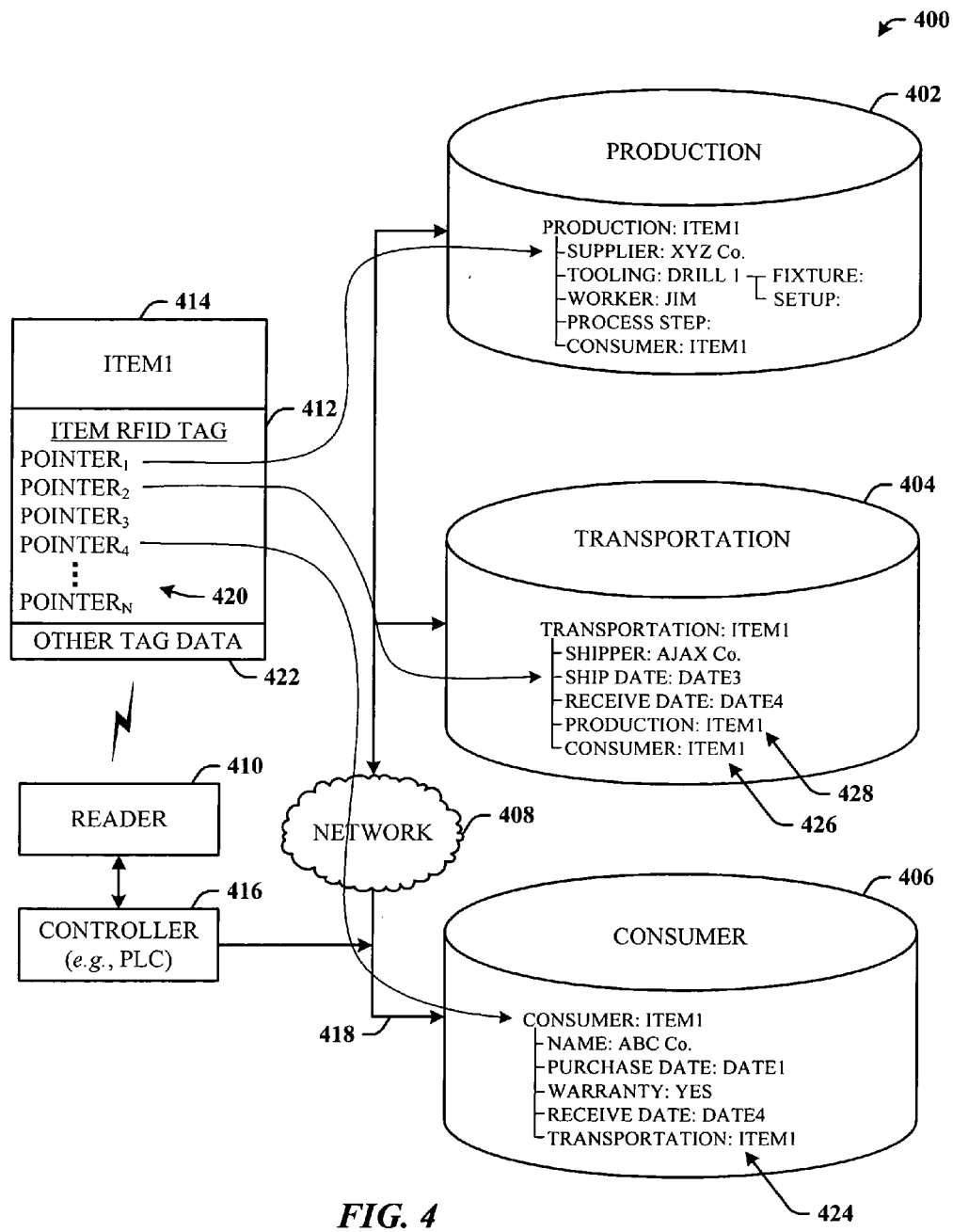
FIG. 4 illustrates an exemplary distributed hierarchical database system 400 in accordance with the subject invention.

FIG. 4 illustrates an exemplary distributed hierarchical database system 400 in accordance with the subject invention. The system 400 includes a production hierarchical database 402 that stores production information (e.g., the supplier name, date made, tool operator, tool, . . . ), a transportation hierarchical database 404 that stores item transport information (e.g., date item received for manufacturing or assembly, date shipped, shipper information, . . . ) about movement of the items, and consumer hierarchical database 406 that stores consumer information (e.g., warranty, name, data purchased, date received, . . . ). Other types of information can be stored in other types of database that are not shown. For example, where there is a chemical process that occurs, recipe information can be stored along with chemical information and so on. Note that the databases (402, 404, and 406) can be at different locations or the same location. They need not be geographically different (e.g., miles apart). However, here, consumer database 406 is shown as geographically distinct from the other two databases (402 and 404) such that access can be across a network 408 (e.g., the Internet, WAN, WLAN . . . ).

The system 400 can also include an RFID reader 410 that reads an RFID tag 412 of an item 414. The reader 410 can interface to an industrial controller 416 (e.g., a PLC-programmable logic controller), the controller 416 disposed in a packet network 418 to pass data to any of the databases (402, 404 and 406), and other database not shown.

The RFID tag 412 can include many types of data. Here, the tag 412 includes pointers 420 (denoted POINTER$_1$, POINTER$_2$, POINTER$_3$, POINTER$_4$ . . . , POINTER$_N$, where N is an integer) and other tag data 422. The first pointer (POINTER$_1$) can be extracted and processed to point to the production database 402, and more specifically, to the supplier. A second pointer (POINTER$_2$) can be extracted and processed to point to the transportation database 404, and more specifically, to shipping data (e.g., the ship date). Similarly, a fourth pointer (POINTER$_4$) can be extracted and processed to point to the consumer database 406, and more specifically, to the general category of consumer information.

Note that when initially directed to a database, the user can jump to another database therefrom using pointers embedded therein. For example, the consumer database 406 includes a pointer 424 (denoted TRANSPORTATION: ITEM1) that when selected, routes the user to the transportation database 404, and at the level TRANSPORTATION: ITEM1 . Similarly, the transportation database 404 includes a pointer 426 (denoted CONSUMER: ITEM1) that when selected, routes the user back to the consumer database 406, and at the level CONSUMER: ITEM1, and a pointer 428 (denoted PRODUCTION: ITEM1) that when selected, routes the user back to the production database 402, and at the level PRODUCTION: ITEM1. Once at the PRODUCTION: ITEM1 level, the user can then navigate forward down the hierarchy to other data (e.g., tooling, worker, tooling/fixture, tooling/setup . . . ), or backward up the tree to other information which can be on the same database or that routes the user to a different database. For example, although not shown, if the user chooses to navigate backward from the PRODUCTION: ITEM1 level of the production database 402, pointers to any other databases (e.g., 404 and 406) can be accessed that direct the user to the selected database.

In summary of one novel aspect provided by this pointer capability, the user and/or any devices so programmed to do so, can navigate forward and backward through the hierarchy of the distributed databases, thereby facilitating traceability of any or all parts of an assembly that includes RFID tagged parts. Information referenced from this pointer could be used by the PLC on the plant floor, a warehouse management system or even a logistics network. Some of the databases based upon existing plant floor IT standards (e.g., such as SP95 Factory Talk Data Model or S88), Warehouse Management Systems, Control System Databases, and ERP can be extended to support this RFID information.

Figure 5:
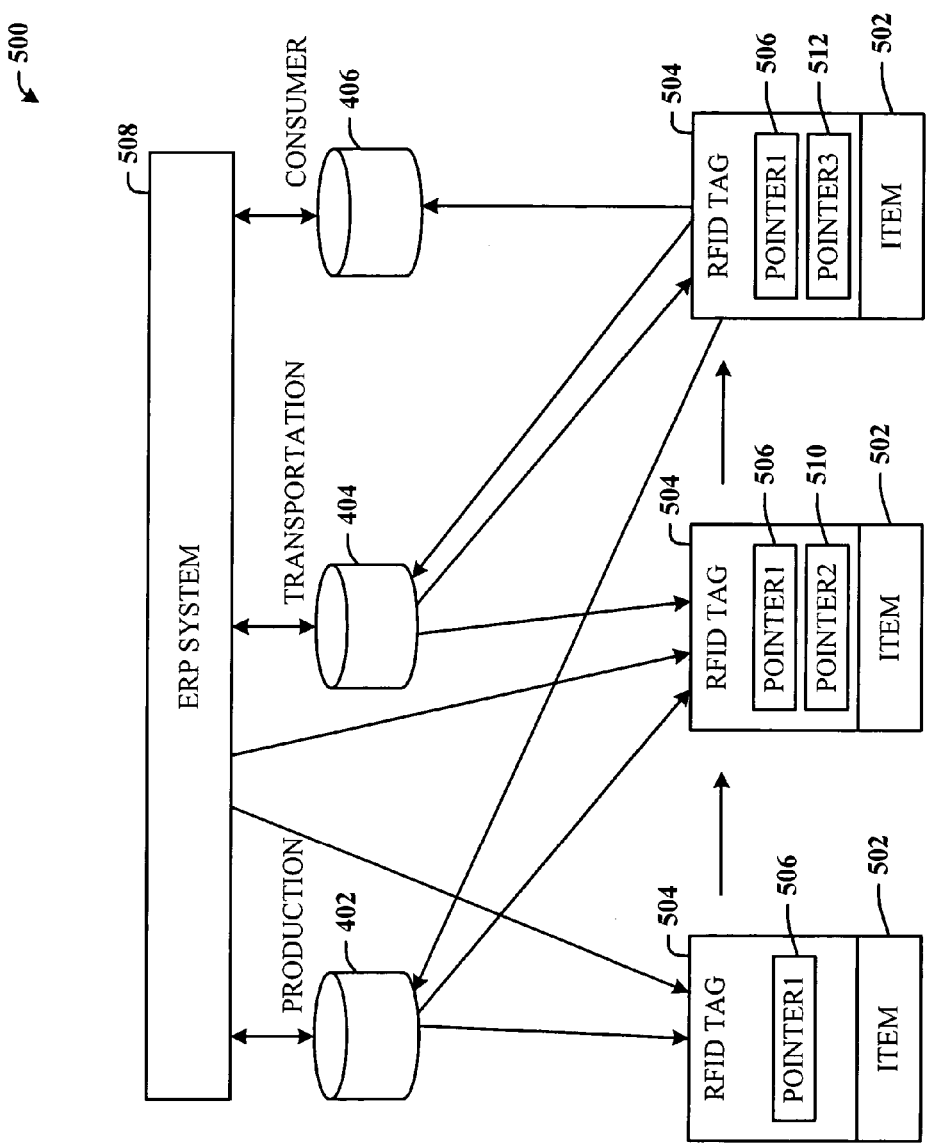
FIG. 5 illustrates a manufacturing system in accordance with an aspect of the invention.

FIG. 5 illustrates a manufacturing system 500 in accordance with an aspect of the invention. An item 502 is tagged with an RFID tag 504 and introduced into a production area of the system 500. Initially, the tag 504 does not need to include an initial pointer 506 (e.g., a backward and/or forward pointer); however, the tag 504 can include the initial pointer 506 (denoted POINTER1) that can then be updated or changed as the item 502 leaves the production area, although this is not required. In one implementation, however, the item 502 includes the pointer 506 that can be read by an RFID reader (not shown) at a particular point in the production process, and directs data to a specific location in the production database 402 that is configured for receiving and storing data in a record or records associated with the item 502 during the production process. The initial pointer 506 can be passed from the production database 402 through a production system (not shown) that includes a PLC and an RFID reader/writer which facilitate writing the initial pointer data to the RFID tag 504. In an alternative implementation, an ERP system 508 facilitates writing of the initial pointer data into the tag 504. The ERP system 508 can interface to each of the database systems (402, 404 and 406) for overall monitor and control of all data and signals being communicated in the system 500.

It is to be appreciated that the item 502 can be virtually anything produced in a manufacturing process, where the items are solely RFID tags being produced and initially configured. The pointer can be utilized to reference information located at any data location. The information referenced by the pointer can be duplicated to a data location within the ERP system 508. Alternatively, another pointer referencing the location of the information in production database 402, for example, can be established in the ERP system 508.

The item 502 can undergo a series of process and/or assembly steps during the production phase. Examples of such process steps include: item manufacture, item assembly, item processing, refinement, item post-production, item subcomponent manufacture, item subcomponent assembly, and the like. Depending on the desired application of the pointer, the pointer can reference any information stored on a data location and/or ERP system 508 at any process step.

It is to be appreciated that while system 500 indicates one production stage, with one series of process steps, one database 402, and one ERP system 508, the system 500 is not so limited. Virtually any number of additional production stages can be integrated into the system 500, depending on the production processes required to complete manufacture, which can require multiple separate production facilities. It is to be further appreciated that the item 502 can return to any production facility to undergo additional process steps, if it is so desired.

When the item 504 leaves the production area, and is ready for transportation to a consumer, the production database 404 can facilitate writing final production information, for example, into the tag 504. Alternatively, the final production pointer 510 (denoted POINTER2) can be written to the tag 504 that points to final production information in the production database 402 which is associated with the item 504. However, as indicated supra, the final production pointer information 510 can be written over the initial production pointer data 506 during an update or change process. Again, in an alternative implementation, the ERP system 508 can facilitate writing of the final production pointer data 510 into the tag 504 prior to or when the item 502 enters the transportation area.

Consider at this point that the item tag 504 includes a final production pointer 506 that points to final production data in the production database 402 and a transportation pointer 510 that points to an aspect of the transportation phase in the transportation database 404. Once the item 502 is ready to be transported or has entered the transportation chain, either to the consumer or distribution network, or to further production facilities, the transportation pointer 510 can be updated along the way to reference any of the databases (402 404 and 406) and the ERP system 508.

For the purposes of illustrating a common hierarchical distributed application of the system 500, there are three databases shown. Commonly, there will be separate data stores for production facilities and transportation infrastructure. While in this schematic, databases 504, 404, and 406 are depicted as separate entities, it is to be appreciated that the system 500 is not so limited. It is within contemplation that there could be only one datastore associated with the production facility, the transportation infrastructure, and the consumer information. Furthermore, there can be many more than three such datastores associated with the entities through which the item 502 passes.

When the item 502 reaches the consumer location, such information can be written to the RFID tag 504 of the item 502 as a consumer pointer 512 (denoted POINTER3) to the relevant consumer information in the consumer database 406. Here, at the consumer phase, the transportation pointer 510 is not shown. It is to be appreciated that where multiple pointers are employed, a pointer once created can later be deleted. This is because the forward and backward pointer capability provided herein allows a single pointer to be utilized to access all information associated with the item 502, from any location and from any database.

Additionally, database 404 is capable of communicating up the supply chain with database 402 (at the production level), and database 404 is also capable of communicating down the supply chain with database 406 (at the consumer level). In other words, the system 500 is capable of providing historical information associated with the item 502, and also capable of feeding information forward to the consumer downstream, additional production facilities, or additional transportation infrastructure. For example, when a consumer orders the item 502 and, the item 502 is completed and shipped, the system 500 can generate a notification event to the consumer that indicates that the item 502 is en route and its anticipated arrival date. For an additional example, when an item 502 is to be transported using a combination of first ground and then air transport infrastructure, the system 500 can notify the air transport infrastructure when the item 502 departs from the production facility in response to the air transport system scanning and reading the pointer information. These examples are merely illustrations of possible applications of system 500 and embedded RFID tag pointer information, and are not intended to be exhaustive of the myriad possible applications.

Once transport is completed, the item 502 and pointer(s) are received by a consumer. The consumer database 406 can be referenced via an embedded tag pointer o facilitate the relay of information to the ERP system 508.

It is to be appreciated that while the production stage, transport stage, and consumer stage are shown as a sequential operation, the system 500 is not so limited. As described previously, the item 502 and associated pointer(s) can go through multiple cycles of production and transport stages. Moreover, the item 502 can be returned by the consumer through the transport stage to a repair facility. The stored pointer or pointers can be utilized to reference information stored in datastores along the way back to the repair facility in this return process.

Figure 6:
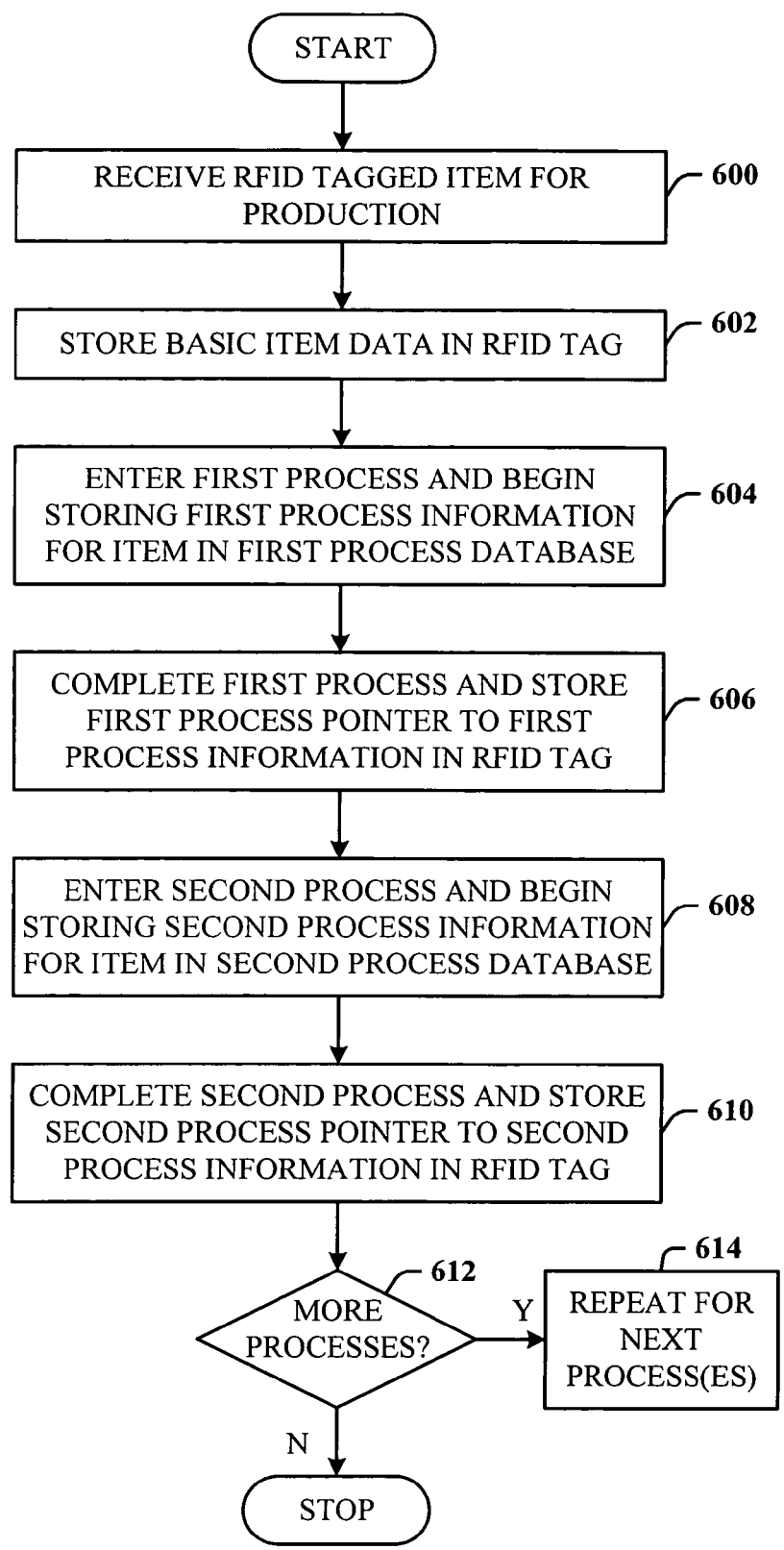
FIG. 6 illustrates a methodology of employing multiple pointers in an RFID tag in accordance with the invention.

FIG. 6 illustrates a methodology of employing multiple pointers in an RFID tag in accordance with the invention. At 600, an RFID tagged item is received for production. At 602, basic item data is stored in the RFID tag. At 604, the item enters a first process where process information associated with the item is being stored in a first process database. At 606, the first process is completed, and a first process pointer is written to the RFID tag for storage that points to first process information in the first process database. At 608, the item enters a second process, and second process information associated with the time begins to be stored in a second process database. At 610, when the second process completes, a second process pointer that points to second process information can be written to the item's RFID tag for storage and later access. At 612, the system determines if further processes are available. If no, the methodology stops. Alternatively, if other processes are available, flow is from 612 to 614 to repeat for the next process(es). Again, is indicated supra, the tag can store multiple different pointers, a single pointer that is overwritten or any combination of separate and overwritten pointers.

Figure 7:
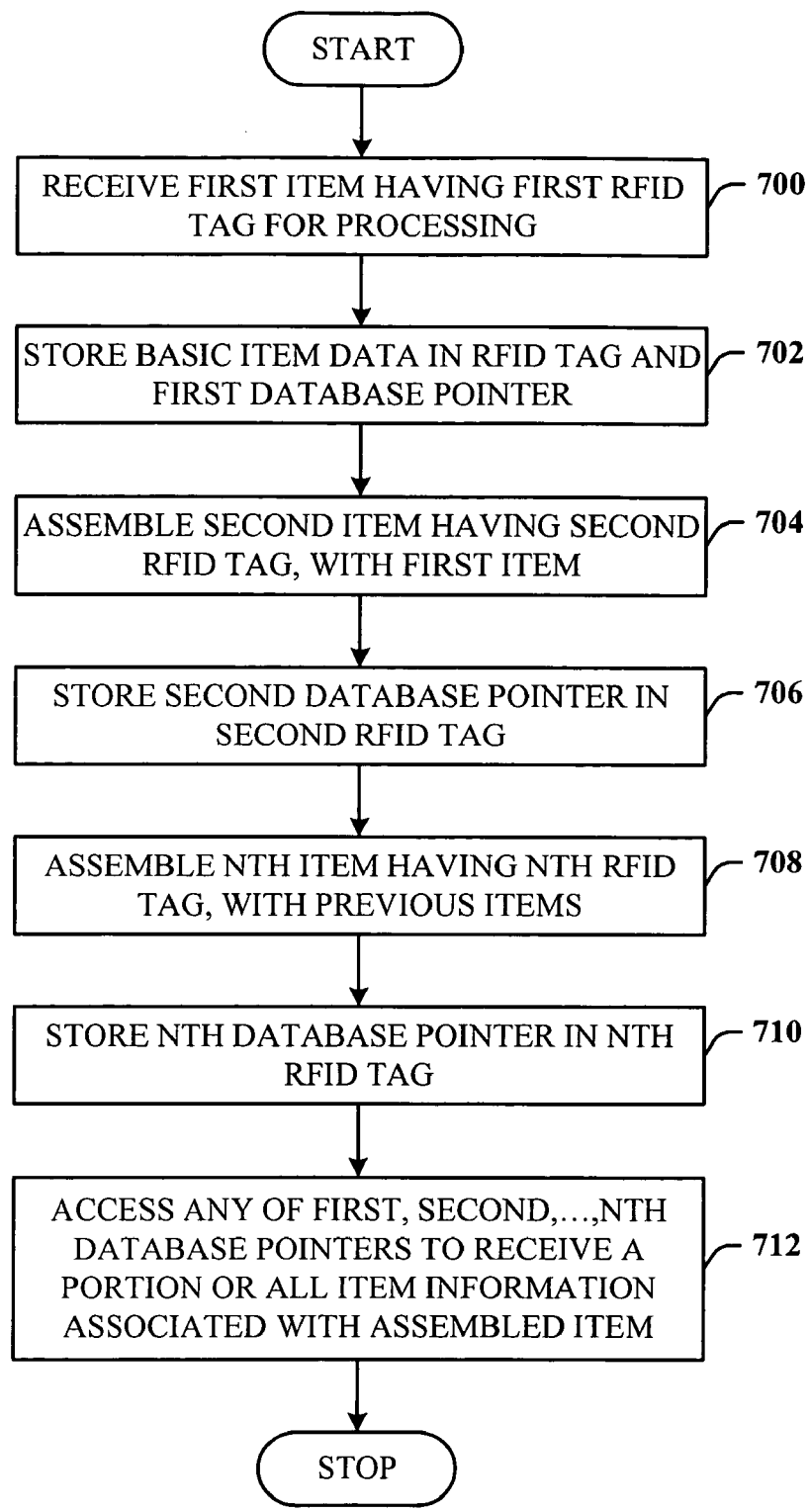
FIG. 7 illustrates a methodology of accessing any RFID tagged part of an assembly by employing an RFID tag pointer in accordance with the invention.

FIG. 7 illustrates a methodology of accessing any RFID tagged part of an assembly by employing an RFID tag pointer in accordance with the invention. At 700, an RFID tagged item is received for processing. At 702, basic item data is stored in the RFID tag and a first database pointer. At 704, a second RFID tagged item is assembled with the first item. At 706, a second database pointer is stored in a second RFID tag of the second item. At 708, an Nth RFID tagged item is assembled with the previous RFID tagged items. At 710, an Nth database or data location pointer is stored in the Nth RFID tag. At 712, any of the first, second through Nth database pointers can be accessed to receive a portion or all item information associated with items in the assembled item. This is due to the forward/backward capability provided for moving up and down the distributed hierarchical data structure to access all associated item information.

Figure 8:
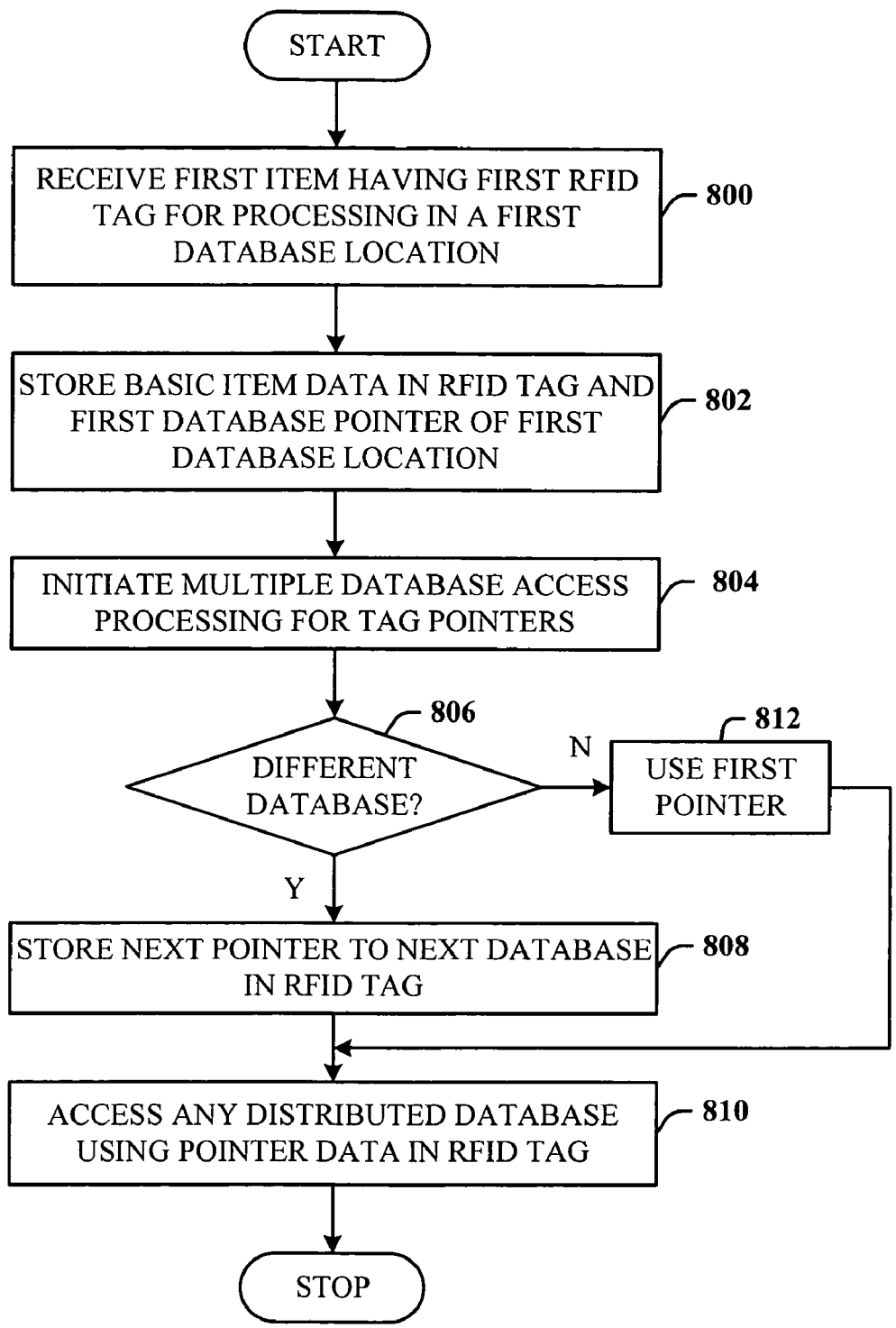
FIG. 8 illustrates a methodology of providing multiple tag pointers only according to predetermined criteria in accordance with the invention.

FIG. 8 illustrates a methodology of providing multiple tag pointers only according to predetermined criteria in accordance with the invention. It is to be appreciated that only a single pointer in the RFID tag is needed to access all of the information associated with the item. However, based on the bandwidth considerations for distributed databases, it may be desirable to write a pointer to an RFID tag only when the item crosses database boundaries into another area where another database stores the associated data. For example, when the item moves from the production area having a production database to the transportation area which has a transportation database it may be more efficient in terms of system bandwidth to access the transportation database instead of the production database, which in many cases would take longer to access since it could be physically further down the network. Thus, the system automatically tracks and determines when the tag should be written with the most conveniently or efficiently accessible database pointer(s) as it moves through the enterprise chain.

Accordingly, at 800, a first item having a first RFID tag is received for processing in a first database location. At 802, basic item data is stored in the RFID tag along with a first database pointer of the first database location. At 804, a multiple database access algorithm is initiated to determine when to replace existing pointer data of the tag with the more efficient database access pointer data. At 806, the system, determines if the item has entered an area that stores process data on a different database. If so, at 808, the system facilitates writing a new pointer to the RFID tag that allows local access to the local database rather than the previous process database. At 810, the system can then still access any distributed database via the "local" database system using the pointer data due to the backward/forward navigation capability of the hierarchical data structure. If the item moves to a different process that uses the same database as in the previous process, flow is from 806 to 812 to use the first pointer, since this would point to the same database.

Figure 9:
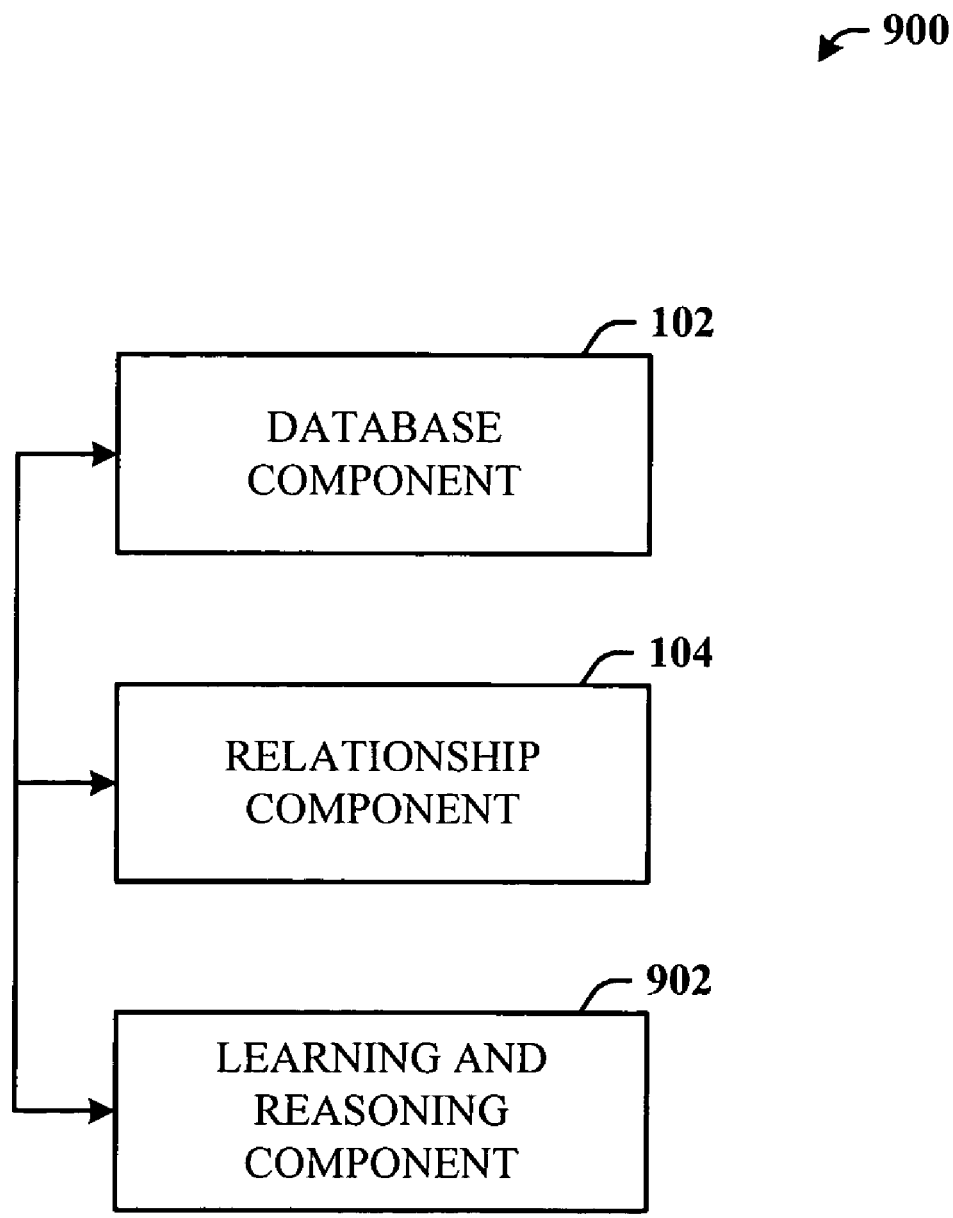
FIG. 9 illustrates a system that employs a machine learning and reasoning component which facilitates automating one or more features in accordance with the subject innovation.

FIG. 9 illustrates a system 900 that employs a machine learning and reasoning (LR) component 902 which facilitates automating one or more features in accordance with the subject innovation. The LR component 902 can interface to both the database component 102 and the relationship component 104 for learning and automation, for example. The subject invention (e.g., in connection with selection) can employ various LR-based schemes for carrying out various aspects thereof. For example, a process for determining what pointer information and when to write the pointer information can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining according to a predetermined criteria if a single pointer should be written into an RFID tag or multiple pointers should be written thereto. In another application, the LR component 902 can be employed to determine automatically when to stored process data and to what length or detail the pointer should be when written to the RFID tag. For example, it may be necessary to include a pointer that points exactly to an element of a record, whereas in another instance the pointer need only point to a record that includes the element and other elements. These are but only a few examples f the benefits obtained from employing the LR component 902 are not to be construed as limiting in anyway.

Figure 10:
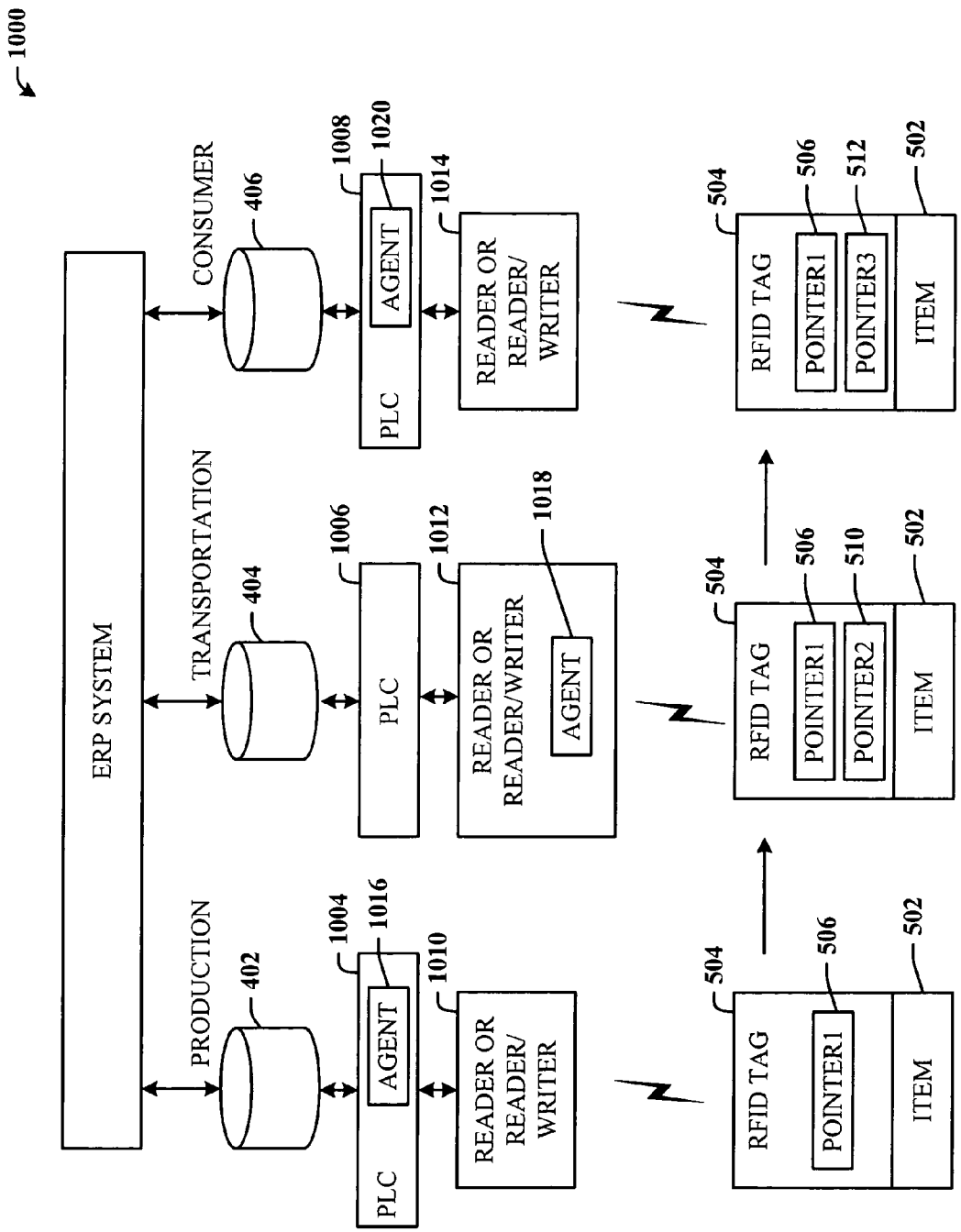
FIG. 10 illustrates a client that reads the pointer information of an RFID tag in accordance with an aspect of the subject invention.

FIG. 10 illustrates a system 1000 that employs software agents in accordance with an aspect of the subject invention. While the physical information may be stored at different places within the enterprise, a standardized data structure that points to relevant production information makes it easier and faster for disparate manufacturing facilities to manage RFID information. This capability will also make it easier for software agents, which are basically autonomous applications that automate decision making by establishing a set of rules (e.g., if X happens, do Y), to manage decision making. Thus, agents 1002 can be used to automate routine decisions and alert employees when a situation requires their attention, or even make it easier to drive automation on the plant floor. Accordingly, the software agent can also employ the LR component 902 of FIG. 9.

As illustrated in FIG. 10, each of the production, transportation, and consumer areas include a corresponding PLC 1004, 1006 and 1008, and an RFID reader 1010, 1012, and 1014 (or reader/writer) that can read (or read and write) RFID tag information. In the production area, the PLC 1004 interface to the production database 402 to store and access production information. The PLC 1004 can also include an agent 1016 that functions at least as described above. In the transportation area, the PLC 1006 interfaces to the transportation database 404 to store and access transportation information. Here, the reader (or reader/writer) 1012 can also include an agent 1018 that functions at least as described above. Similarly, in the consumer area, the PLC 1008 interfaces to the consumer database 406 to store and access consumer information. Here, the PLC 1008 can also include an agent 1020 that functions at least as described above.

Each of the readers (or reader/writers) 1010, 1012 and 1014 access the RFID tag data stored on the tag 504 of the item 502 as the item, moves through the enterprise chain. Additionally, each of the agents (1016, 1018 and 1020) facilitate pointer processing of the pointers 506, 510 and 512, as needed or desired.

Figure 11:
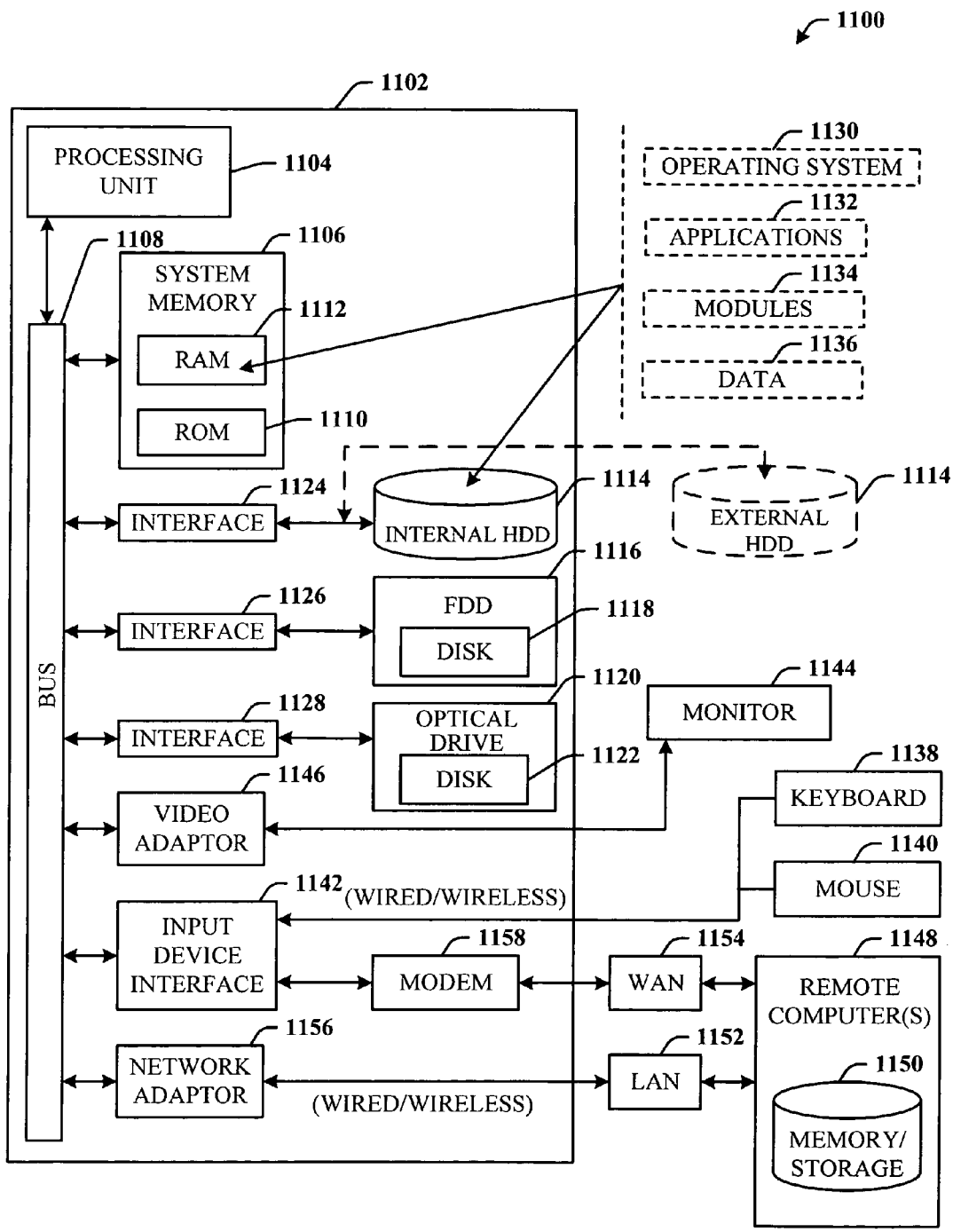
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.1a) or 54 Mbps (802.11b) data rate, for example, or with products that contain both bands (dual band), so the networks can provide real-world performance similar to the basic 10BaseT wired Ethernet networks used in many offices.

Figure 12:
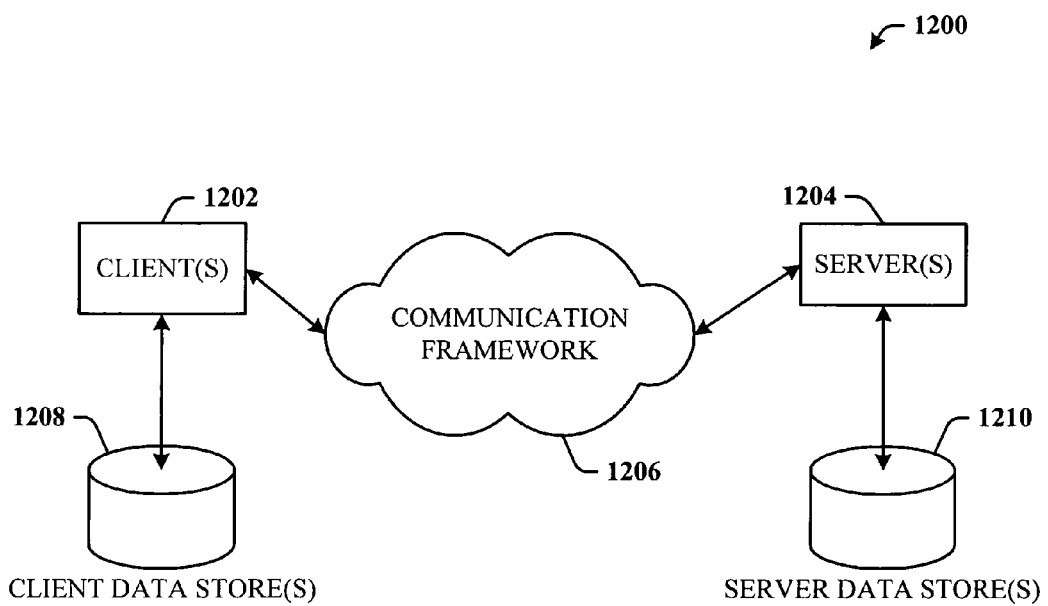
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that manages data, comprising:
 a database component that facilitates hierarchical representation of radio frequency identification (RFID) data records of an RFID tagged item;
 a relationship component that relates RFID elements of the RFID records using backward and forward pointers, the RFID elements include manufacturing and process information of the various stages of a production process associated with the RFID tagged item; and
 an RFID tag associated with the RFID tagged item that includes a pointer to an RFID element of an RFID data record from the database component such that other RFID elements can be accessed via the backward and forward pointers, the pointer in the RFID tag is updated to point to the RFID element, the RFID element is associated with a current stage of the production process.

2. The system of claim 1, wherein the RFID elements include transportation information associated with a transportation phase of the RFID tagged item and consumer information associated with a consumer phase of the RFID tagged item.

3. The system of claim 2, wherein the pointer in the RFID tag is updated to point to an RFID element that is associated with a current stage of the transportation phase or consumer phase stage of the production process.

4. The system of claim 1, wherein the database component includes a distributed database including a plurality of databases to which each can be navigated from at least one other database of the plurality of databases via the backward and forward pointers.

5. The system of claim 4, further comprising a machine learning and reasoning component that employs a probabilistic or statistical-based analysis to determine according to predetermined criteria whether a single pointer or multiple pointers should be written to the RFID tag to point to the plurality of databases.

6. The system of claim 5, wherein the machine learning and reasoning component employs a multiple database access algorithm that determines when to update the single or multiple pointers based upon system bandwidth of the distributed database.

7. The system of claim 4, the plurality of databases include a chain of standardized hierarchical databases across a supply chain.

8. The system of claim 1, wherein a subset of the hierarchical representation is a database that is stored in part in at least one of: a programmable logic controller (PLC), a workstation, or a computer.

9. The system of claim 1, wherein the RFID elements are related by pointer that includes a hypertext transfer protocol (HTTP) hyperlink.

10. The system of claim 1, the forward pointer allows movement and selection of information down the hierarchical representation of data records, the backward pointer allows movement and selection of information up the hierarchical representation of data records.

11. A system that manages data, comprising:
a database of enterprise information that stores a hierarchical representation of radio frequency identification (RFID) data records of an item; and
an RFID tag of the item that has a pointer to a data record of the item stored in the distributed database, the pointer is updated to point to a data record of the item associated with a current process stage of the item as the item moves through different process stages of the item associated with enterprise information.

12. The system of claim 11, wherein the process stages are associated with one or more of a production phase, a transportation phase, and a consumer phase.

13. The system of claim 11, wherein the RFID tag includes multiple different pointers that each point to a different record of the RFID data records in the database.

14. A method of managing data in a radio frequency identification (RFID) environment, comprising:
writing an address that points to a datastore entity to a pointer stored in an RFID tag associated with an item, the address is written over with a different address to update the pointer as the item progresses through an industrial process, wherein the different address points to a datastore entity associated with a current stage of the item in the industrial process;
reading the pointer to extract the address therefrom;
locating the datastore based at least in part on the address;
accessing the datastore to obtain data associated with the item; and
utilizing data associated with the item in the industrial process.

15. The method of claim 14, further comprising an act of adding data to the datastore associated with the item in response to the act of reading the pointer.

16. The method of claim 14, wherein the datastore is accessed by at least one of: a PLC, an RFID reader or reader/writer, a warehouse management system, or a logistics network.

17. The method of claim 14, further comprising an act of writing a plurality of the pointers to the RFID tag.

18. The method of claim 14, further comprising an act of deleting select ones of a plurality of the pointers written to the RFID tag based in part on an area in which the item is processed.

19. The method of claim 14, further comprising an act of accessing any part of the distributed database by utilizing the pointer.

20. The method of claim 14, further comprising an act of tracing any item of a plurality of assembled RFID tagged items using a single pointer of one of the RFID tags.

21. The method of claim 14, the address written to the pointer includes at least one of: a hypertext transfer protocol (HTTP) hyperlink, an alphanumeric designation, or a directory path.

22. The method of claim 14, further comprising an act of accessing data in the datastore associated with the item via backward and forward pointers in the datastore.

23. A system that facilitates data management of a radio frequency identification (RFID) tagged item, comprising:
means for recording location of a data element in a database of an enterprise as a pointer in an RFID tag, the database of the enterprise comprising information associated with at least one of a production phase, a transportation phase, or a consumer phase associated with the item;
means for reading the RFID tag to determine the location of the data element;
means for accessing the database;
means for obtaining the data element associated with the item from the database; and
means for writing an update to the pointer in the RFID tag, wherein the update is the location of a data element in the database associated with a current stage of the item in the at least one of production phase, transportation phase, or consumer phase.

24. The system of claim 23, further comprising means for writing data to the database via the pointer.

25. The system of claim 23, further comprising means for writing a new pointer to the RFID tag.

* * * * *